(12) United States Patent
Feldmeier

(10) Patent No.: US 7,637,284 B1
(45) Date of Patent: Dec. 29, 2009

(54) SANITARY DIAPHRAGM VALVE

(76) Inventor: Robert H. Feldmeier, 7632 Hunt La., Fayetteville, NY (US) 13066

( * ) Notice: Subject to any disclaimer, the term of this patent is extended or adjusted under 35 U.S.C. 154(b) by 0 days.

(21) Appl. No.: 12/244,863

(22) Filed: Oct. 3, 2008

(51) Int. Cl.
*F16K 11/20* (2006.01)

(52) U.S. Cl. .................. 137/883; 137/885; 251/61.1; 92/97

(58) Field of Classification Search ........... 137/863, 137/872, 883, 885; 251/61.1, 61.2, 63.5, 251/331; 92/97
See application file for complete search history.

(56) References Cited

U.S. PATENT DOCUMENTS

| 766,420 | A | * | 8/1904 | Calley ............... 137/636.1 |
| 2,317,271 | A | | 4/1943 | Higley et al. |
| 2,577,967 | A | * | 12/1951 | Hughes ................ 251/25 |
| 3,838,707 | A | | 10/1974 | Wachowitz, Jr. |
| 3,897,041 | A | | 7/1975 | Cowan |
| 4,779,641 | A | | 10/1988 | Charm et al. |
| 4,794,940 | A | | 1/1989 | Albert et al. |
| 6,659,247 | B2 | | 12/2003 | Lafler et al. |
| 6,668,848 | B2 | | 12/2003 | Lafler et al. |
| 7,063,304 | B2 | | 6/2006 | Leys |
| 7,131,461 | B2 | * | 11/2006 | Xu et al. ............... 137/828 |
| 7,364,132 | B2 | | 4/2008 | Browne et al. |

* cited by examiner

*Primary Examiner*—John Fox
(74) *Attorney, Agent, or Firm*—Bernhard P. Molldrem, Jr.

(57) ABSTRACT

A sanitary diaphragm valve has a valve body formed of an upper plate and a lower plate, with a flexible resilient diaphragm and a spacer between them. The margin of the diaphragm rests on a peripheral step formed in the lower plate to create a positive space between the lower plate and the edges of the diaphragm. A piston within a cylinder in the upper plate can descend to compress the diaphragm against a valve port to close the valve. The pressure of the liquid product can raise the diaphragm and the piston when control pressure is relieved from the piston.

9 Claims, 5 Drawing Sheets

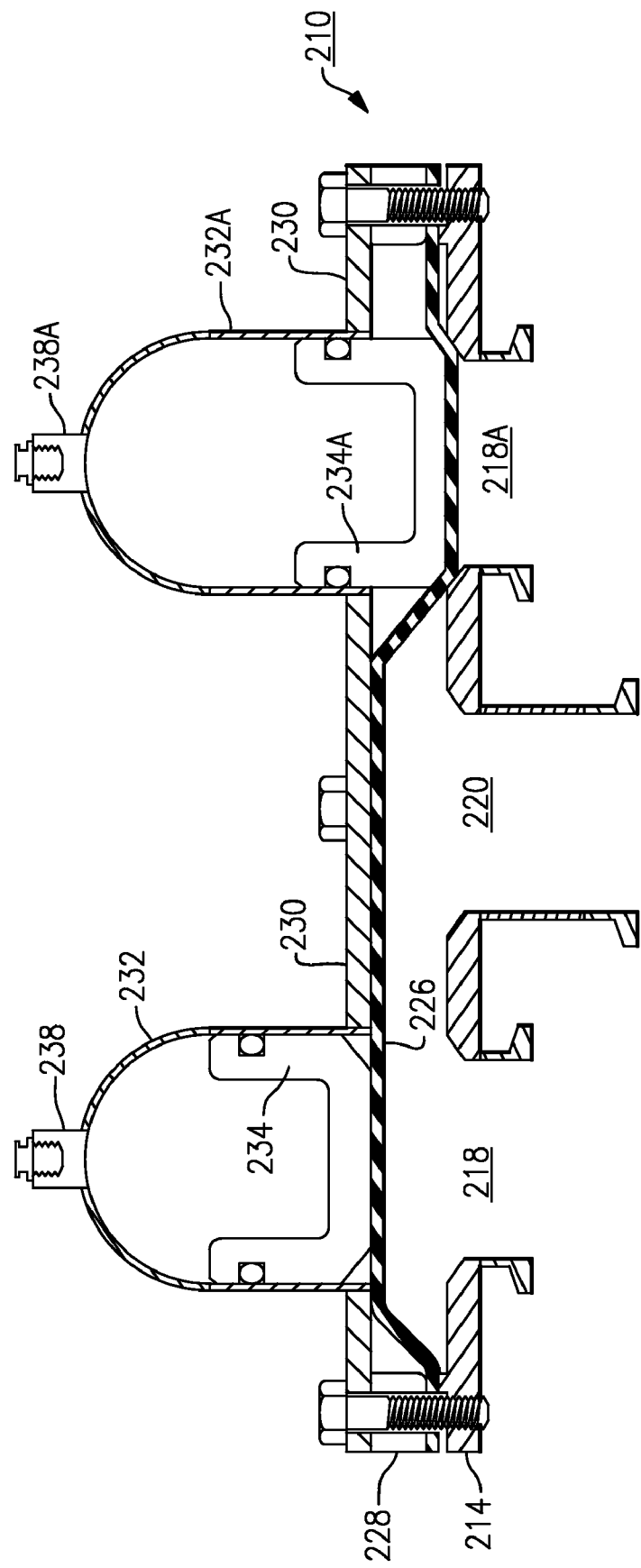

SANITARY DIAPHRAGM VALVE

BACKGROUND OF THE INVENTION

This invention relates to equipment for processing of liquids used in products for human consumption, e.g., dairy products such as milk, cream, and ice cream mix, other liquid food products, e.g., fruit juices and soups, or pharmaceuticals. The invention is more particularly concerned with sanitary valves of the type used in the dairy, food processing, and/or pharmaceutical industries, in which the flow of a fluid is to be regulated or diverted from one flow path to another. The invention is also concerned with diaphragm valves, that is, valves of the type in which a flexible membrane conforms to a fluid port, when pressed against the port, to limit, restrict, or block the flow of the fluid. The invention is more specifically concerned with a diaphragm valve of simple design and which can be cleaned and sterilized in place by the flow of a cleaning liquid through the valve. Sanitary diaphragm valves of this type can be used in a milk pasteurization line as a bypass valve or as a pressure regulating valve.

Pasteurization of milk and other processes for heat treating milk or other food or ingestible products are required to conform to published standards of the U.S. Public Health Service, and there are similar regulations concerning equipment for processing other products. By law, the milk or other product has to be heated to certain temperatures and held at a particular temperature. The pressures and pressure differentials of the product have to be closely monitored at certain points in the process. This means that accurate pressure regulating valves have to be present in the conduit, and must be replaced whenever they fail. Diversion valves are also required to divert the milk or other liquid food product from a continuous flow pasteurization path to another path in the event that the process needs to be interrupted or if a problem develops in the line. On the other hand, in order to ensure that the sanitary conduit can be cleansed and sanitized between processes, the conduit, including any diversion valves and pressure regulating valves, need to be designed so that it can be completely cleaned in place of any milk or other product by washing it and rinsing it with a cleaning fluid that must reach every point on the interior of the conduit, including every point in the valve cavities. No threaded connectors can be used anywhere that the liquid product flows, because of the difficulty in cleaning the threads. In order to accommodate this requirement, the sanitary valves used in the dairy industry and other food processing industries have been complex and difficult to repair and maintain, and represent a significant capital expense.

An example of a diaphragm valve is described in Hughes U.S. Pat. No. 2,577,967. That valve is a differential type diaphragm valve, and is controlled by pressure in an air line. The closure force of the valve is the resultant of the difference in pressure in the space above the diaphragms and in the space between the diaphragms. A diaphragm based poppet valve, as used in the chemical processing industry, is described in Leys U.S. Pat. No. 7,063,304. Diaphragm valves can also be used as pilot valves in the context of a pneumatic volume booster, e.g., Lafler et al. U.S. Pat. No. 6,668,848.

A sanitary diaphragm valve is described in Browne et al. U.S. Pat. No. 7,364,132. That particular valve has a cone shaped actuator, and a bowl or dome-shaped housing with a hemispherical valve cavity. That valve requires complex internal surfaces to permit the inside of the sanitary valve to be cleansed and sterilized.

OBJECTS AND SUMMARY OF THE INVENTION

It is an object of the present invention to provide a sanitary diaphragm valve arrangement of simple construction, and capable of being cleaned in place when installed in conduits for liquid food products, which is capable of controlling flow and/or pressure of the liquid product, and which avoids the drawbacks of the prior art.

It is another object to provide a sanitary valve that is formed of a flat plate construction, avoiding the need to machine or manufacture complex surfaces within the valve cavity.

Another object is to provide a valve design permitting the valve to be constructed as a simple two-port valve or as a multiple-port valve.

It is a further object to provide a diaphragm valve that is capable of reliably regulating the flow pressure of fluids in a sanitary flow path.

According to one aspect of the invention, a sanitary diaphragm valve is provided for use in connection with a sanitary conduit, e.g., a pasteurizer, through which a liquid product, e.g., milk, flows. The sanitary diaphragm valve is formed of a flat lower plate and a similarly shaped flat upper plate. The flat lower plate has an upper side with a central recess area and a peripheral raised step that surrounds the central recess area. Within the central recess area there is a first round opening leading to a first tubular port on a lower side of the plate, and a second opening leading to a second tubular port on the lower side of the lower plate. A flexible resilient diaphragm lies atop the lower plate and is generally coextensive with the lower plate so as to cover the central recess area and extend onto the peripheral raised step. A spacer then is positioned on top of the edge of the diaphragm over the step area. The spacer defines a predetermined thickness distance up from the diaphragm.

The flat upper plate is coextensive with the lower plate and lies atop the spacer. A cylinder is positioned on the upper plate above the first opening of the lower plate and in register therewith. The cylinder extends upward above the second plate and has an open side facing the first opening. A piston within the cylinder is free to move up and down between a raised position and a lowered position. In the raised position, the diaphragm is allowed to move away from the first opening, under the fluid pressure, to permit the liquid product to flow through the first opening. In the lowered position the piston pushes the diaphragm closed against a rim of the first opening and thus closes off the first opening to flow of fluid.

Bolts, clamps, or other fastening devices hold the peripheral edges of the upper and lower plates, the spacer and the diaphragm together. Control air in an air conduit, or other means, provides the motive force to cause the piston to descend and close the valve, either to cut off flow or to regulate its pressure. Typically, the first port is used as the inlet so that when the valve is open, the fluid flows in through the first port, into the interior of the valve below the diaphragm, and then out through the second port. This control means can involve an air nipple in the cylinder, either above or below the piston, and a control air conduit can be attached here to apply compressed air to the cylinder. In a preferred embodiment, there is a second diaphragm above the piston, and the compressed air is applied to the space between said cylinder head and the second diaphragm, so that the diaphragm pushes the piston downwards. In a manually actuated valve, the means for controllably moving the piston can involve a hand screw, i.e., a screw-threaded post passing through a female thread on a cylinder head of said piston, with an end biased against the piston, and a hand wheel for rotating the threaded post to move the piston.

In one preferred embodiment, the diaphragm is a flat sheet of a food-grade silicone rubber.

In another embodiment, the cylinder can incorporate a compression spring positioned above the piston and biasing the piston towards its lowered position. This can involve a supplemental air piston above the one that closes the diaphragm. In that case, the control air is supplied below the supplemental piston to move that upwards against the spring. This relieves spring force from the main piston. Flow is normally stopped by the spring force, but the valve is opened when the control air is applied.

The spacer is not sealed but open to the ambient, so that any leakage of liquid into the space above the diaphragm and below the upper plate will leak out and be visibly evident.

A multiple outlet diaphragm valve can be constructed also according to the principles of this invention. In that case, the flat lower plate has a first round opening leading to a first tubular port on a lower side of the plate, a second opening leading to a second tubular port on the lower side of the plate; and at least a third round opening leading to a third tubular port on the lower side of the plate. All these are situated within the recess area defined by the peripheral step.

The flexible resilient diaphragm lies atop the lower plate and is generally coextensive with it, so as to cover the central recess area and extend onto the peripheral raised step. As in the earlier-described embodiment, the spacer lies atop the diaphragm periphery or margin and also atop the peripheral step portion of the lower plate.

The flat upper plate is coextensive with the lower plate and lies directly atop the spacer. The upper plate has a first cylinder situated above said first opening and in register with it, and a second cylinder formed above the third opening and in register with that opening. In some embodiments, the spacer could be unitarily formed with the upper plate.

There are first and second pistons situated within these first and second cylinders, respectively, and each is independently movable between a raised position and a lowered position. In the raised position, the piston allows the diaphragm to move away from the respective opening to permit fluid flow, and in the lowered position the piston pushes the diaphragm against a rim of the respective opening to close the associated opening off to fluid flow. The pistons and cylinders can employ an upper diaphragm at the cylinder head, with control air being applied above the upper diaphragm. Alternatively, the upper diaphragm can be omitted, and the piston(s) may have a ring seal such as an O-ring to preclude leakage of air into the space between the upper plate and the diaphragm.

The lower tubular ports can have a flanged end. A tri-clamp or equivalent sanitary clamp means holds the flange end to the sanitary conduit. The tri-clamp allows the adapter to be removed for maintenance.

The processing equipment associated with this invention may be used for whole milk, skim milk, cream, or other dairy products such as flavored milk or ice cream mix. The arrangements of this invention may also be used for processing orange juice, grapefruit juice, apple juice, or other fruit juices. The equipment may be of a tubular heat exchanger design, and may be cleaned-in-place with a minimum of down time. A triple-tube heat exchanger that is suitable for use in various possible processes is described in Feldmeier U.S. Pat. No. 3,386,497, which is incorporated herein by reference.

The above and many other objects, features, and advantages of the arrangements and techniques of the present invention will become apparent from the ensuing detailed description of a preferred embodiment of the invention, when considered in connection with the accompanying Drawing.

BRIEF DESCRIPTION OF THE DRAWING

FIG. 8 shows a variation of the second embodiment.

DETAILED DESCRIPTION OF THE PREFERRED EMBODIMENT

Figure 1:
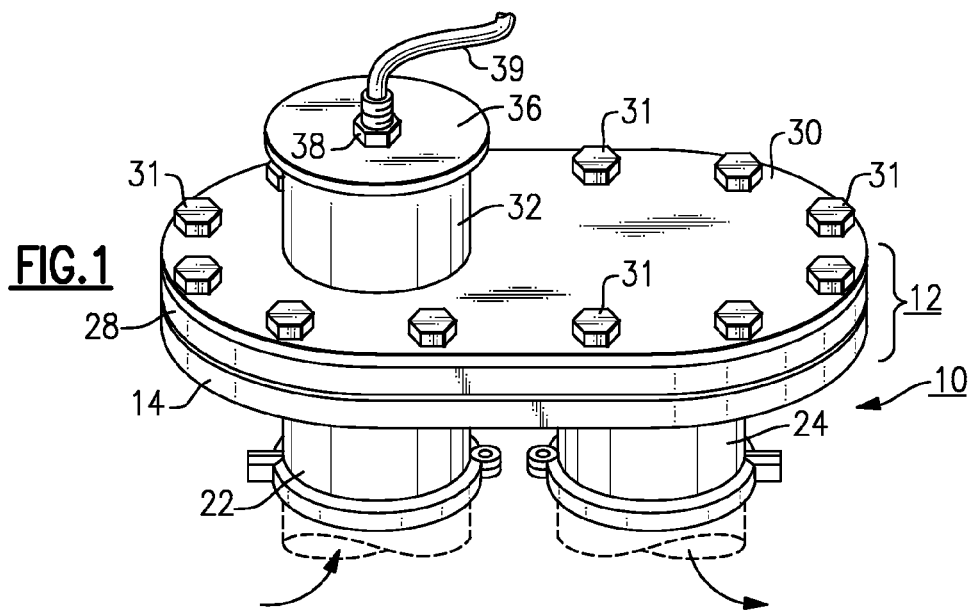
FIG. 1 is perspective view of a sanitary diaphragm valve according to one embodiment of the invention.
Figure 2:
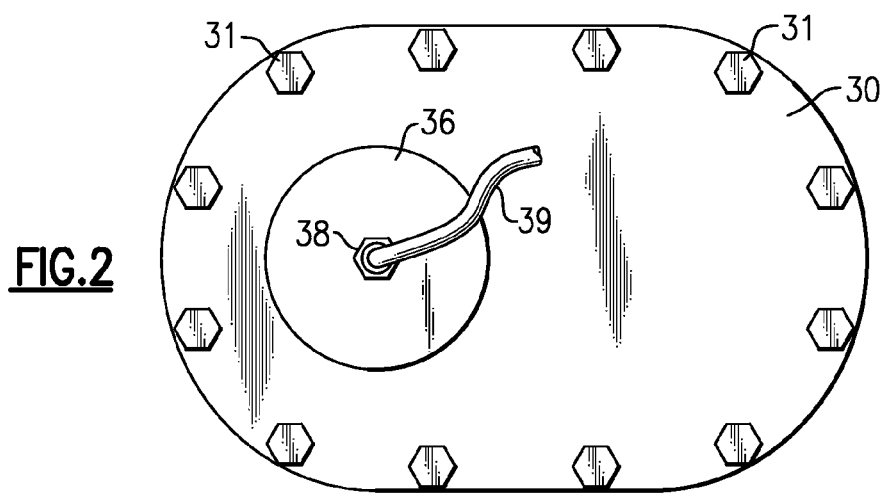
FIG. 2 is a top plan view thereof.
Figure 3:
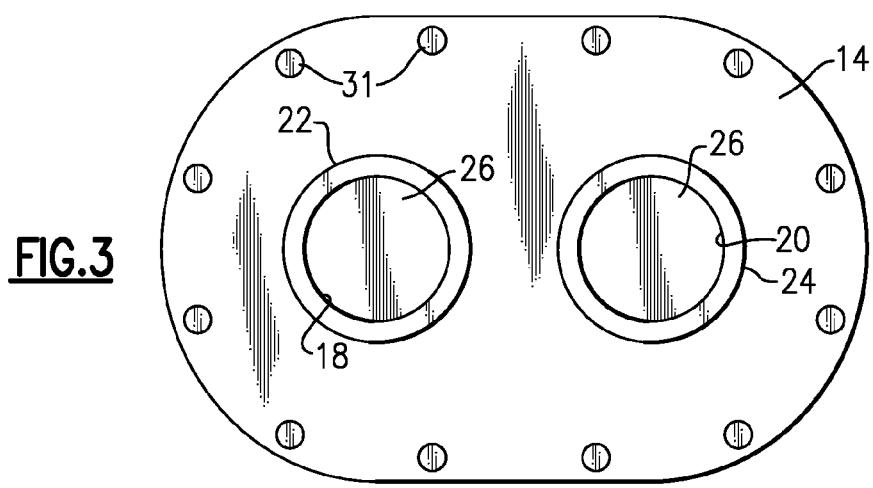
FIG. 3 bottom plan view thereof.

With initial reference to the embodiment illustrated in FIGS. 1 to 5, a sanitary valve 10 of the present invention may be employed on a tubular sanitary conduit, which may be of the type that processes a dairy product, such as milk or ice cream mix, another edible product such as fruit juice, sauce or soup, or a pharmaceutical product for human or veterinary use.

The sanitary valve 10 of this embodiment has a valve body 12 formed of a lower plate 14, an upper plate 30 and other members sandwiched between them, as will be described. The lower plate 14 has a peripheral step 16 (see FIGS. 4 and 5) that is formed around the perimeter of the plate 14 and defines within it a recessed area. A first valve port 18 is positioned at the left in these views, and a second valve port 20 is at the right. These valve ports are circular in shape, and have a conic beveled upper edge. A tubular stub 22 with a flanged end extends down from the first circular valve port 18, and another similar tubular stub 24 extends down from the second valve port 20. These are connected to flanged tubing of the piping for the liquid product, e.g., by means of tri-clamps or other suitable connection devices.

A diaphragm 26 formed of a sheet of flexible resilient food grade material lies just over the lower plate 14, and the outer margin of the diaphragm rests on the peripheral step 16. The material should be a type that can withstand elevated temperatures such as those used in pasteurization, and in a preferred embodiment a silicon rubber material is used.

A spacer 28, which is in the form of an oval ring, sits atop the step 16 and holds down the margin of the diaphragm 26. The upper plate, which is generally the same shape and dimensions as the lower plate 14, is placed on top of the spacer, and is held down by a series of threaded fasteners 31 that pass through the upper plate 30, spacer 28, margin of the diaphragm 26 and then fasten into female threads formed in the periphery of the lower plate 14.

Figure 4:
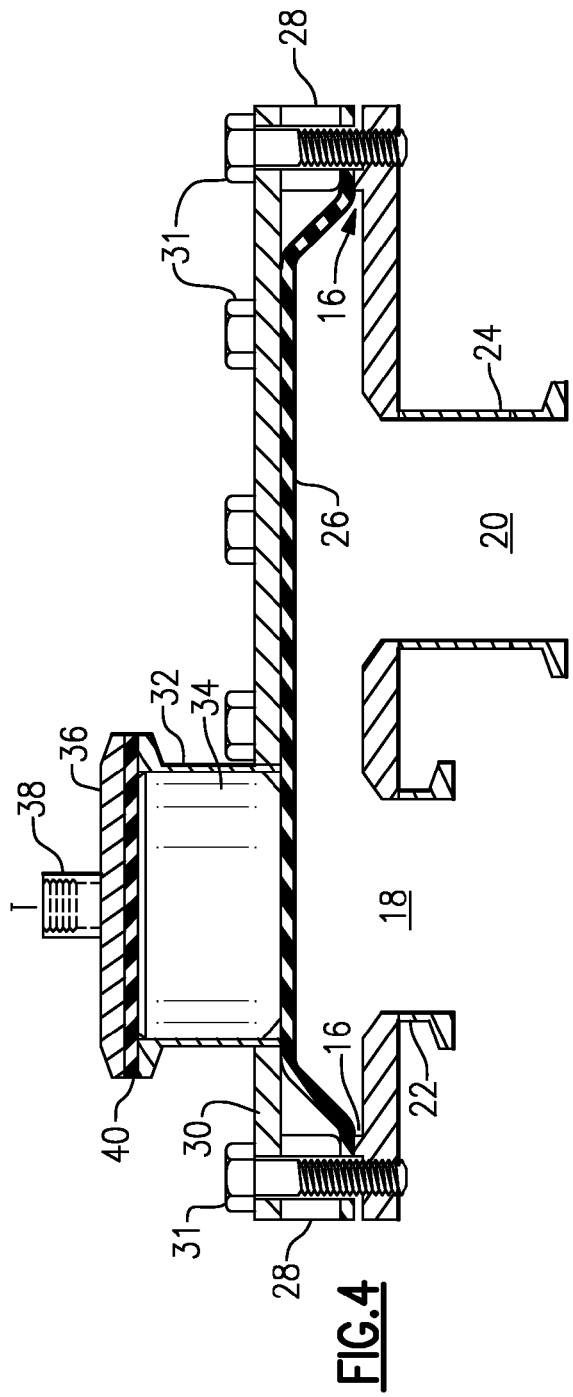
FIG. 4 is a cross sectional view thereof showing the piston and diaphragm in a raised or open position.
Figure 5:
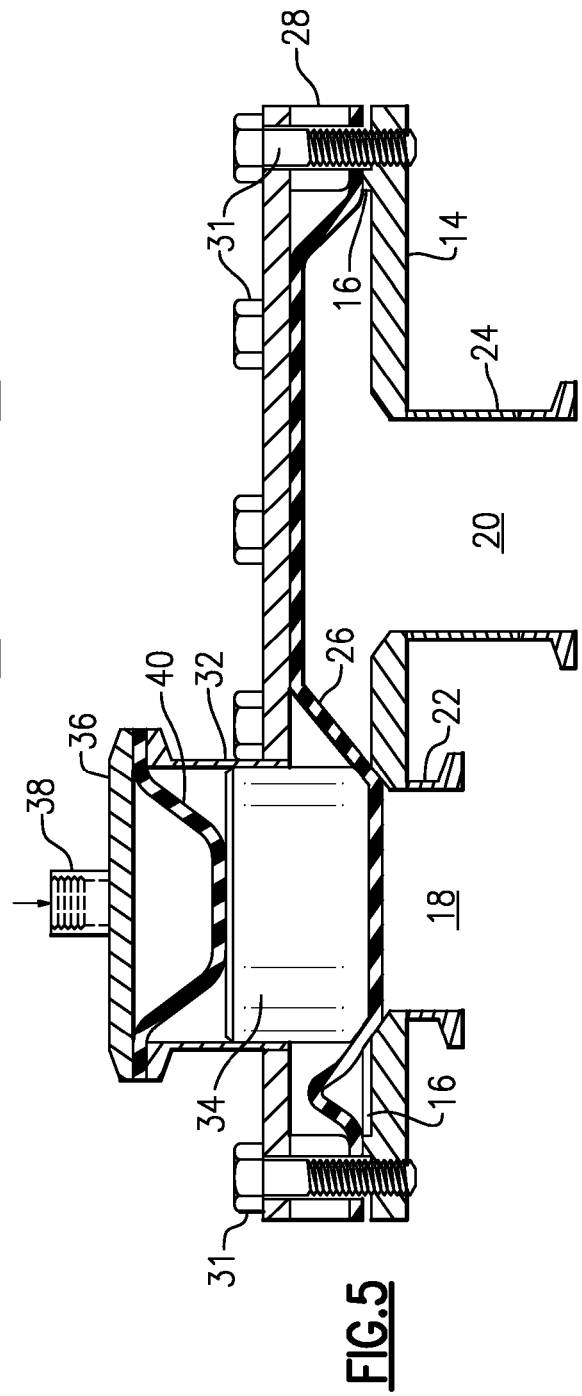
FIG. 5 is a cross sectional view thereof showing the piston and diaphragm in a lowered or closed position.

At the upper side of the upper plate 30 is positioned a cylinder 32 that is aligned with the first valve port 18, i.e., on the left in FIGS. 1 to 5. As shown in FIGS. 4 and 5, there is a free piston 34 within the cylinder 32. A head or cap 36 of the cylinder has an air nipple 38 that connects to a control air tube 39 that applies air pressure to close the valve or to maintain a given pressure level within the liquid product piping. The cylinder 32 is open below the top plate 30. In this embodiment, there is an upper diaphragm 40 within the cylinder and situated between the cylinder cap 36 and the piston 34. This can be made of the same material as the main valve diaphragm 26.

When air pressure to the nipple 38 is relieved, the pressure of the liquid product pushes the diaphragm 26 up, and this pushes the piston 34 up to the position as shown in FIG. 4. In this condition, there is an open fluid passage for the liquid between the first port 18 and the second port 20. When air pressure is applied to the nipple 38, the space between the cap 36 and the upper diaphragm 40 inflates, and this pushes the piston 34 and diaphragm 26 downward until the diaphragm 26 engages the rim of the first port 18 to close it off. If the air pressure to the nipple 38 is high enough to move the piston 34 to the lowered position, but less than the fluid pressure coming in to the port 18, the piston and diaphragm will regulate the pressure of the fluid entering the valve cavity and leaving the second valve port 20.

Here, the piston 34 can be formed of a suitable lightweight plastic material or aluminum, and provided with a low friction coefficient with respect to the cylinder walls.

The spacer 28 is not sealed, so any fluid that enters the space above the diaphragm 26 and below the upper plate 30 will seep out, and provide a visible indication of possible diaphragm failure. When this occurs, it is a simple matter to remove the bolts or fasteners 31, lift off the upper plate 30 and spacer 28, and then change out the diaphragm 26 and replace the spacer, upper plate, and bolts. This change out can be carried out in the plant, and does not require removing the valve from the piping, nor is factory maintenance or repair needed. Also, in this design the control air cannot leak into the fluid product, as the space above the diaphragm 26 is at ambient pressure.

The spacer 28 need only have a thickness of one-half the radius of the valve port 18 to achieve an unobstructed full flow of the liquid product when the valve 10 is in the open condition.

The step 16 creates a positive space at the margins of the diaphragm 26, i.e., between the diaphragm and the lower plate 14, so that there are no obstructed or closed off areas in the valve cavity. This allows the valve 10 to be cleaned in place by flowing a cleaning solution and a sterilizing fluid through it.

Figure 6:
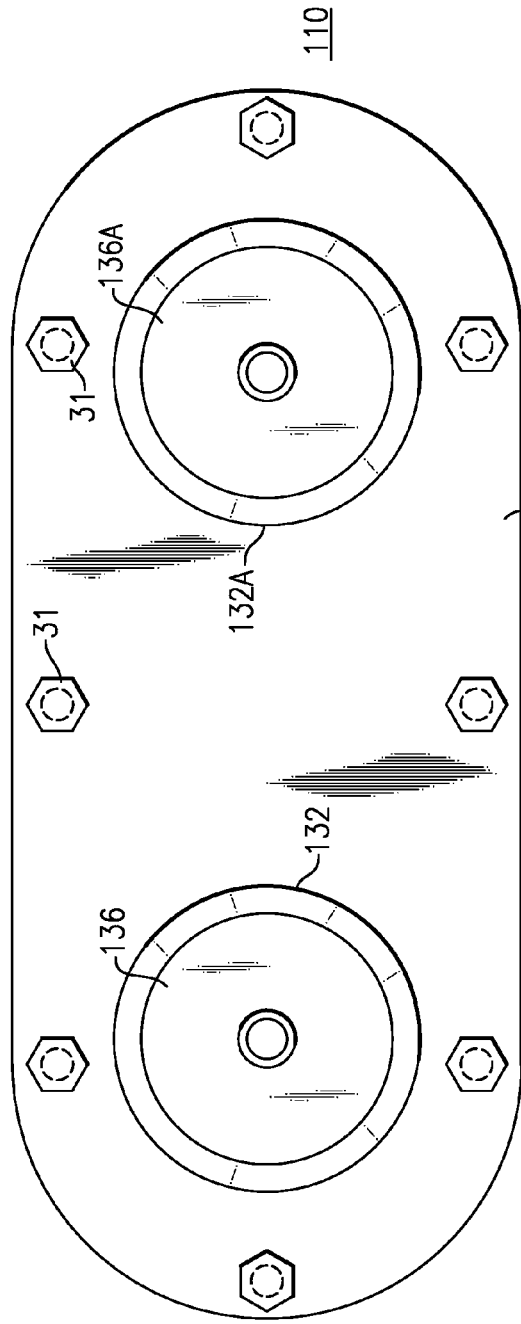
FIG. 6 is a top plan view of a second embodiment thereof.
Figure 7:
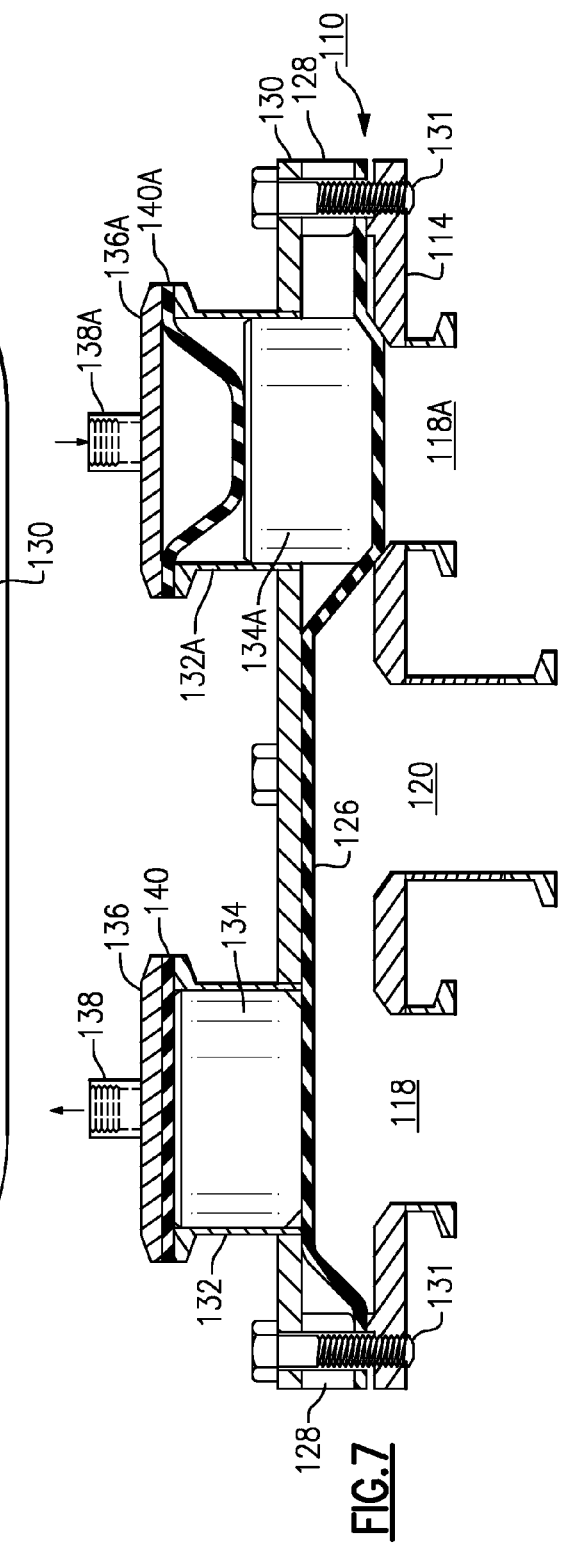
FIG. 7 is a cross sectional view of the second embodiment.

A second embodiment of this sanitary diaphragm valve of this invention is shown in FIGS. 6 and 7, in which parts and elements that correspond to those in the first embodiment are identified with similar reference numbers, but raised by "100" and a detailed description of those elements need not be fully repeated. In this element, the diaphragm valve 110 provides multiple ports rather than only the two ports, i.e., rather than only the inlet port and outlet port, of the first embodiment. Here, there is one open port and two controlled ports, but the number need not be limited and a valve can be designed with any number of valve ports, depending upon the number of flow path options.

In this embodiment, the base or bottom plate 114 has a peripheral step 116, as in the first embodiment, and there is a diaphragm 126, spacer 128 and upper plate 130, as well as a series of bolts or other fasteners 31. The lower plate 114 has a first port 118 at the left, a central second port 120, and a third port 118A at the right. The upper plate has a pair of cylinders 132 and 132A situated to correspond to the positions of the first and third valve ports 118 and 118A, respectively. Each cylinder has a respective piston 134, 134A, an upper diaphragm 140, 140A held down by the respective cylinder cap 136, 136A, and each has an air inlet nipple 138, 138A. These air nipples are connected to respective control air lines (not shown).

FIG. 7 shows this diaphragm valve 110 with the left or first valve port 118 open, and with the third valve port 118A closed. That is, air pressure is relieved from the first cylinder 132 and air pressure is applied to the second cylinder 132A, so that the diaphragm 126 pushes the first piston 134 upwards to its raised position, while the upper diaphragm 140A pushes the second piston 134A to its lowered position, biasing the diaphragm 126 against the rim of the third valve port 118A. Here, for example, the liquid food product flows into the valve cavity through the central port 120, and is valved to the first port 118. If the flow needs to be diverted, then the control air pressurization can be reversed, raising the piston 134A and lowering the piston 134, so that the liquid product is redirected to flow out the valve port 118A.

Of course, the valve can be configured so that both ports 118 and 118A can be open at the same time, or so that both can be closed. The valve 110 of this embodiment can be used to control fluid pressure in both directions.

A third embodiment of the diaphragm valve of this invention is shown in FIG. 8, in which the elements described in respect to the earlier embodiments are identified with similar reference numbers, but raised by "200", and for which a detailed description can be omitted.

This valve 210 is similar to the diaphragm valve of the second embodiment, except that this valve 210 employs a pair of domed cylinders 232 and 232A situated in the upper plate 230. Here, the upper diaphragm members of the earlier embodiments are omitted from the cylinders. The pistons 234 and 234A are of a hollow cup shape to relieve weight and material, and there are seal rings present in the walls of the pistons, between the pistons and the inside walls of the cylinders 232 and 232A. The action and response of this valve 210 are similar to those of the valve 110.

Figure 9:
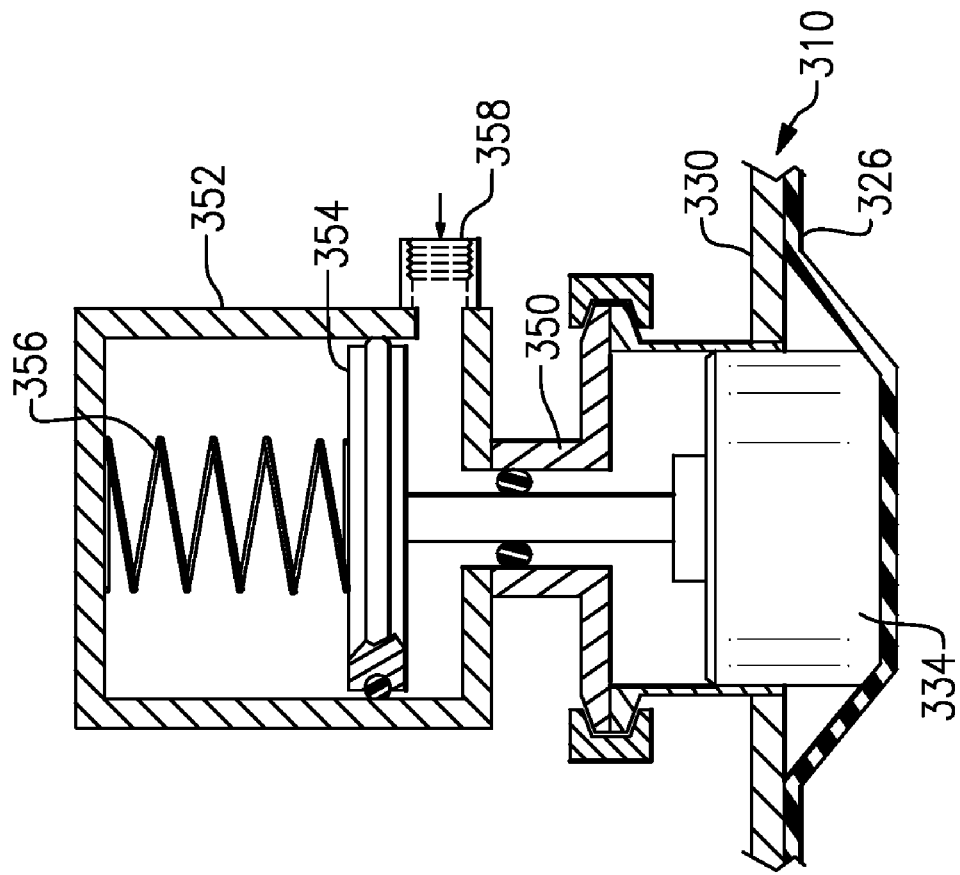
FIG. 9 shows a piston and cylinder arrangement of an alternative embodiment.

Another embodiment, in which the valve is normally biased closed, and in which air is applied to open the valve, can be described with reference to FIG. 9. Here the relevant portions of a sanitary diaphragm valve 310 is shown, where the major elements of the valve are the same as described earlier, and similar parts are identified with similar reference numbers but raised by "300." The cylinder 332 here has an attachment 350 in the form of a flanged tube with an upper air cylinder 352, which contains a footed air piston 354 that has a foot resting against the main piston 334. A compression spring 356 biases the main piston 354 downward, which presses the piston 334 down to its lowered position to close the associated valve port. Here an air nipple 338 applies the control air to the upper cylinder 352 below the piston 354 to raise it. There are seals at the wall of the piston 354 and in the tubular attachment 350 to seal the control air from flowing down into the cylinder 332 and to confine air to the upper cylinder 352.

Figure 10:
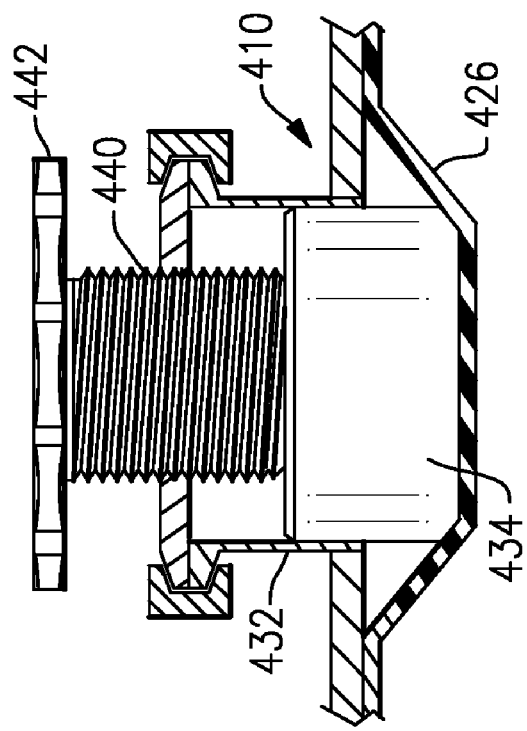
FIG. 10 shows a manual control of a further embodiment.

Another variation is shown in FIG. 10, in which the sanitary diaphragm valve 440 can be manually closed by rotation of a hand wheel 442. Here, elements that correspond to those in the earlier embodiments are identified with similar reference numbers but raised by "400."

The valve 410 or this embodiment, instead of relying on control air or another fluid to bias the piston 434 downwards, has a threaded post 440 that engages a female threaded opening in the cylinder cap 436. The post 440 has the hand wheel 442 affixed to its upper end, and its lower end rests against the top surface of the piston 434. Turning the wheel 442 moves the post 440 and piston 434 downwards to push the flexible resilient diaphragm down to engage the associated valve port. Turning the wheel 442 in the other direction relieves the force on the piston 434, and allows the diaphragm to move upwards to open the valve port.

In each of the described embodiments, the terms upwards, downwards, upper, lower, left and right are employed for simplicity of explanation in respect to those illustrated embodiments, regardless how the valves may be oriented in any practical application. These terms as used in the specification and in the claims are not intended to limit the valve to any specific orientation.

The sanitary diaphragm valves of this invention can be serviced in place, e.g., to replace any of the pistons or diaphragms, simply by removing the fasteners 31, disassembling the valve body, and replacing or changing out the diaphragms, piston(s) or any associated seals.

The sanitary diaphragm valve can be cleaned in place, as the step 16 creates a positive space at the edges of the main diaphragm, allowing cleaning solution to reach every area of the valve cavity.

The simple construction of the valve, without complex shapes of cavities or passageways, and with only a minimum number of required parts, is inexpensive to manufacture, and is simple to install and maintain. The valve is sturdy and reliable.

While the invention has been described with reference to a number of preferred embodiments, it should be understood that the invention is not limited only to those embodiments. Rather many variations are possible without departing from the scope and spirit of this invention, as defined in the appended Claims.

I claim:

1. A sanitary diaphragm valve comprising:
    A flat lower plate having an upper side with a central recess area with a flat upper surface and a peripheral raised step surrounding the central recess area, said central recess area having a first round opening leading to a first tubular port on a lower side of the plate, and a second opening leading to a second tubular port on the lower side of the plate, each of said first and second round openings having a beveled edge recessed below the upper surface of said central recess area;
    A flexible resilient diaphragm lying on the lower plate and generally coextensive therewith so as to cover said central recess area and extend onto said peripheral raised step;
    A spacer having a predetermined thickness and extending above said peripheral step and coextensive therewith, the spacer lying atop said diaphragm;
    A flat upper plate coextensive with said lower plate and lying atop said spacer; the upper plate having a cylinder formed therein situated above said first opening and in register therewith, the cylinder extending upward above the second plate and having an open side facing said first opening;
    A piston within said cylinder and movable between a raised position allowing said diaphragm to move away from said first opening to permit fluid flow therethrough, and a lowered position in which the piston pushes the diaphragm against the recessed beveled edge of said first opening to close the first opening off to flow of fluid;
    Fastener means holding a peripheral edge of said plate and said spacer to the peripheral step portion of said lower plate, with the diaphragm being biased therebetween; and
    Means for controllably moving the piston to and/or from its lowered position to control movement of fluid through said first opening and said first tubular port.

2. The sanitary diaphragm valve of claim 1 wherein said cylinder includes a diaphragm member above said piston and held between an upper rim of said cylinder and a cylinder head thereof; and an air nipple for receiving a control air conduit to apply compressed air to space between said cylinder head and said diaphragm member.

3. The sanitary diaphragm valve of claim 1 wherein said means for controllably moving said piston includes a screw threaded post passing through a female thread on a cylinder head of said piston, and having an end biased against said piston, and means for rotating the threaded post to move said piston.

4. The sanitary diaphragm valve of claim 1 wherein said diaphragm is a flat sheet of a silicone rubber.

5. The sanitary diaphragm valve of claim 1 wherein said cylinder includes a compression spring positioned above said piston and biasing the piston to its lowered position, and an air conduit below said spring for admitting air to relieve spring force from said piston.

6. The sanitary diaphragm valve of claim 1 wherein a portion of said spacer is open to the ambient, so that any leakage of liquid into the space between the diaphragm and the upper plate will be visibly evident.

7. The sanitary diaphragm valve of claim 1, wherein each said beveled edge is a conic beveled edge.

8. A sanitary diaphragm valve comprising:
    A flat lower plate having an upper side with a central recess area with a flat upper surface and a peripheral raised step surrounding the central recess area, said central recess area having a first round opening leading to a first tubular port on a lower side of the plate, a second opening leading to a second tubular port on the lower side of the plate; and a third round opening leading to a third tubular port on the lower side of the plate, said openings each having a beveled edge recessed below the upper surface of said central recess area;
    A flexible resilient diaphragm lying on the lower plate and generally coextensive therewith so as to cover said central recess area and extend onto said peripheral raised step;
    A spacer having a predetermined thickness and extending above said peripheral step and coextensive therewith, the spacer lying atop said diaphragm;
    A flat upper plate coextensive with said lower plate and lying atop said spacer; the upper plate having a first cylinder formed therein situated above said first opening and in register therewith, the cylinder extending upward above the second plate and having an open side facing said first opening, and a second cylinder formed therein situated above said third opening and in register therewith, the cylinder extending upward above the second plate and having an open side facing said third opening;
    First and second pistons within said first and second cylinders, respectively, and each being independently movable between a raised position allowing said diaphragm to move away from the respective opening to permit fluid flow therethrough, and a lowered position in which the piston pushes the diaphragm against the recessed beveled edge of the respective opening to close the associated opening off to flow of fluid;
    Fastener means holding a peripheral edge of said plate and said spacer to the peripheral step portion of said lower plate, with the diaphragm being biased therebetween; and
    Means for controllably moving the respective pistons to and/or from their lowered positions, independently of one another, to control movement of fluid through said first opening and said first tubular port, and through said third opening and said third tubular port.

9. The sanitary diaphragm valve of claim 8, wherein each said beveled edge is a conic beveled edge.

* * * * *